(12) United States Patent
Ashikhmin et al.

(10) Patent No.: US 8,830,812 B2
(45) Date of Patent: Sep. 9, 2014

(54) OPTIMIZING PRECODER SETTINGS USING AVERAGE SINR REPORTS FOR GROUPS OF TONES

(75) Inventors: Alexei E. Ashikhmin, Morristown, NJ (US); Adriaan J. De Lind Van Wijngaarden, New Providence, NJ (US); Gerhard Guenter Theodor Kramer, Chatham, NJ (US); Jochen Maes, Veerle (BE); Carl Jeremy Nuzman, Union, NJ (US); Carl Robert Posthuma, Wheaton, IL (US); Danny Van Bruyssel, Temse (BE); Jan S. Verlinden, Deurne (BE); Philip Alfred Whiting, New Providence, NJ (US); Miroslav Zivkovic, 's-Gravenhage (NL)

(73) Assignee: Alcatel Lucent, Boulogne-Billancourt (FR)

( * ) Notice: Subject to any disclaimer, the term of this patent is extended or adjusted under 35 U.S.C. 154(b) by 790 days.

(21) Appl. No.: 12/197,409

(22) Filed: Aug. 25, 2008

(65) Prior Publication Data

US 2009/0060013 A1    Mar. 5, 2009

Related U.S. Application Data

(63) Continuation-in-part of application No. 11/897,877, filed on Aug. 31, 2007, and a continuation-in-part of application No. 11/897,809, filed on Aug. 31, 2007.

(60) Provisional application No. 60/974,262, filed on Sep. 21, 2007.

(51) Int. Cl.
*H04J 1/12*    (2006.01)
*H04B 3/20*    (2006.01)

(52) U.S. Cl.
USPC ............................ 370/201; 370/252; 370/286

(58) Field of Classification Search
USPC ........................................................ 370/201
See application file for complete search history.

(56) References Cited

U.S. PATENT DOCUMENTS 6,292,559 B1 *  9/2001  Gaikwad et al. .............. 379/417
6,317,495 B1 * 11/2001  Gaikwad et al. .............. 379/417

(Continued)

FOREIGN PATENT DOCUMENTS

EP         1109328       6/2001
WO   PCTUS2008010653    1/2009

OTHER PUBLICATIONS

R. Cendrillon et al., "Partial crosstalk precompensation in downstream VDSL" Signal Processing, Elsevier Science Publishers, Nov. 1, 2004, pp. 2005-2019, vol. 84, No. 11.

(Continued)

*Primary Examiner* — Derrick Ferris
*Assistant Examiner* — Joe Combs
(74) *Attorney, Agent, or Firm* — Ryan, Mason & Lewis, LLP (57) ABSTRACT

Techniques are disclosed for compensating for crosstalk using adaptation of data signals transmitted over respective channels of a communication network. In one example, a method comprises the following steps. Data is transmitted to a communication network device via a communication line during a sequence of periods. For each period of the sequence of periods, a separate value of a measure of crosstalk that was measured at the communication network device is received, each value being an average of measurements at the device of measures of crosstalk for a plurality of communication network signal subcarriers. For each individual signal subcarrier of the plurality, a matrix is updated based on the received values, the matrix being configured to precode data transmissions to the communication network device over the individual signal subcarrier. The communication network may be a DSL system, the signal subcarriers may be DSL tones, and the measure of crosstalk may be a SINR value.

22 Claims, 7 Drawing Sheets

(56) References Cited

U.S. PATENT DOCUMENTS

| | | | |
|---|---|---|---|
| 6,536,022 B1* | 3/2003 | Aingaran et al. | 716/115 |
| 7,551,544 B2* | 6/2009 | Laakso et al. | 370/201 |
| 2001/0004383 A1* | 6/2001 | Nordstrom et al. | 375/222 |
| 2001/0006510 A1* | 7/2001 | Nordstrom et al. | 370/286 |
| 2002/0154689 A1* | 10/2002 | Storm et al. | 375/232 |
| 2002/0159422 A1* | 10/2002 | Li et al. | 370/342 |
| 2003/0016626 A1 | 1/2003 | Lagerberg et al. | |
| 2003/0063654 A1* | 4/2003 | Onggosanusi et al. | 375/130 |
| 2003/0210750 A1 | 11/2003 | Onggosanusi et al. | |
| 2004/0264559 A1 | 12/2004 | Cendrillon et al. | |
| 2004/0264587 A1* | 12/2004 | Morejon et al. | 375/260 |
| 2004/0264685 A1* | 12/2004 | Smith et al. | 379/406.06 |
| 2005/0030897 A1* | 2/2005 | Sandhu | 370/236 |
| 2005/0123027 A1* | 6/2005 | Cioffi et al. | 375/222 |
| 2005/0124333 A1* | 6/2005 | Van Den Bogaert et al. | 455/420 |
| 2005/0135496 A1* | 6/2005 | Pisoni | 375/260 |
| 2005/0190826 A1* | 9/2005 | Van Bruyssel et al. | 375/222 |
| 2005/0195892 A1* | 9/2005 | Ginis et al. | 375/222 |
| 2005/0270987 A1* | 12/2005 | Chen | 370/252 |
| 2006/0062287 A1* | 3/2006 | Van Bruyssel | 375/222 |
| 2006/0109923 A1* | 5/2006 | Cai et al. | 375/260 |
| 2006/0153178 A1 | 7/2006 | Cendrillon et al. | |
| 2007/0098099 A1* | 5/2007 | Gore et al. | 375/260 |
| 2007/0104087 A1* | 5/2007 | Tee et al. | 370/208 |
| 2007/0263711 A1 | 11/2007 | Kramer et al. | |
| 2008/0031313 A1* | 2/2008 | Oksman | 375/222 |
| 2008/0049855 A1* | 2/2008 | Duvaut et al. | 375/260 |
| 2009/0052371 A1* | 2/2009 | Ariyur | 370/318 |
| 2010/0278033 A1* | 11/2010 | Ilani | 370/201 |
| 2011/0268227 A1* | 11/2011 | Schenk | 375/296 |

OTHER PUBLICATIONS

R. Cendrillon,"Multi-User Signal and Spectra Coordination for Digital Subscribers Lines," Ph.D. thesis, Department of Electrical Engineering, Dec. 2004, 200 pages, Belgium.

P. Whiting et al., "Performance Results for Digital Subscriber Line Precoders," Alcatel-Lucent Technical Report, ITD-07-4768R, Apr. 2007, pp. 1-35.

ITU-T Recommendation G.993.2, Telecommunication Standardization Sector, "Very high speed digital subscriber line transceivers 2 (VDSL2)," Series G: Transmission Systems and Media, Digital Systems and Networks Digital sections and digital line system—Access Networks, Feb. 2006.

K. Kim et al., "Interference Mitigation in MIMO Systems by Subset Antenna Transmission" Wireless Personal Communications, Kluwer Academic Publishers, D0, Aug. 9, 2006, pp. 305-315, vol. 40, No. 3.

M. Webb et al., "Matrix structure and capacity bounds of MIMO channels in interference" IEE Proceedings: Communications, Institution of Electrical Engineers, GB, Aug. 3, 2006, pp. 476-481, vol. 153, No. 4.

D.P. Palomar et al., "Optimum Joint Transmit-Receive Linear Processing for Vectored DSL Transmission with QoS Requirements", Conference Record of the 36th. Asilomar Conference on Signals, Systems, & Computers, Pacific Grove, CA, Nov. 3-6, 2002; Asilomar Conference on Signals, Systems, & Computers , New York, NY, IEEE, US. vol. 1, pp. 388-392.

PCT International Search Report dated Aug. 27, 2008 (PCT/US2008/004232).

U.S. Appl. No. 11/897,877, filed in the name of G. Kramer et al. on Aug. 31, 2007 and entitled "Determining a Channel Matrix by Measuring Interference."

U.S. Appl. No. 11/897,809, filed in the name of M. Guenach et al. on Aug. 31, 2007 and entitled "Determining Channel Matrices by Correlated Transmissions to Different Channels."

U.S. Appl. No. 11/848,684, filed in the name of A. De Lind Van Wijngaarden et al. on Aug. 31, 2007 and entitled "Method and Apparatus for Self-Tuning Precoder."

U.S. Appl. No. 12/060,653, filed in the name of A. Ashikhmin et al. on Apr. 1, 2008 and entitled "Fast Seamless Joining of Channels in a Multi-Channel Communication System."

U.S. Appl. No. 11/934,347, filed in the name of A. Ashikhmin et al. on Nov. 2, 2007 and entitled "Interpolation Method and Apparatus for Increasing Efficiency of Crosstalk Estimation."

* cited by examiner

OPTIMIZING PRECODER SETTINGS USING AVERAGE SINR REPORTS FOR GROUPS OF TONES

CROSS REFERENCE TO RELATED APPLICATIONS

The present application claims priority to the U.S. provisional patent application identified by Ser. No. 60/974,262 (entitled "Methods for Optimizing Precoder Settings Using Average SINR Reports for Groups of Tones"), filed on Sep. 21, 2007, the disclosure of which is incorporated by reference herein in its entirety.

The present application is a continuation-in-part application of, and claims priority to, the U.S. patent applications respectively identified by Ser. No. 11/897,877 (entitled "Determining a Channel Matrix by Measuring Interference") and Ser. No. 11/897,809 (entitled "Determining Channel Matrices by Correlated Transmissions to Different Channels"), both filed on Aug. 31, 2007, the disclosures of which are incorporated by reference herein in their entirety.

The present application is related to the U.S. patent application identified by Ser. No. 11/848,684 (entitled "Method and Apparatus for Self-Tuning Precoder"), filed on Aug. 31, 2007, the disclosure of which is incorporated by reference herein in its entirety.

The present application is also related to the U.S. patent application identified by Ser. No. 11/796,366 (entitled "Operating DSL Subscriber Lines"), filed on Apr. 26, 2007, the disclosure of which is incorporated by reference herein in its entirety.

FIELD OF THE INVENTION

The present invention relates generally to communication systems, and more particularly to techniques for compensating for crosstalk between communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another, or to provide an increased data rate.

A problem that can arise in multiple channel communication systems relates to crosstalk between the various channels, also referred to as inter-channel crosstalk. For example, in a typical digital subscriber line (DSL) system, each of the channels may comprise orthogonal frequency division multiplexed (OFDM) tones or discrete multitone modulation (DMT) tones transmitted over a physical communication link such as twisted-pair copper wire. A transmission on one subscriber line may be detected on other subscriber lines, leading to interference that can degrade the throughput performance of the system. More generally, a given "victim" channel may experience crosstalk from multiple "disturber" channels, again leading to undesirable interference.

A need exists for techniques that compensate for channel crosstalk in DSL systems and other communication systems that may include unsynchronized channels.

SUMMARY OF THE INVENTION

The present invention in one or more illustrative embodiments provides techniques for compensating for crosstalk using adaptation of data signals transmitted over respective channels of a communication network. For example, in a DSL system, this may be achieved by optimizing precoder settings using average signal-to-interference-plus-noise ratio (SINR) reports for groups of tones.

In one embodiment, a method comprises the following steps. Data is transmitted to a communication network device via a communication line during a sequence of periods. For each period of the sequence of periods, a separate value of a measure of crosstalk that was measured at the communication network device is received, each value being an average of measurements at the device of measures of crosstalk for a plurality of communication network signal subcarriers. For each individual signal subcarrier of the plurality, a matrix is updated based on the received values, the matrix being configured to precode data transmissions to the communication network device over the individual signal subcarrier.

As mentioned, the communication network may be a DSL system, the signal subcarriers may thus be DSL tones, and the measure of crosstalk may be a SINR value.

Advantageously, principles of the invention optimize precoder settings using average SINR reports for groups of tones.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with exemplary communication systems and associated techniques for compensating for crosstalk between communication channels in such systems. It should be understood, however, that the invention is not limited to use with any particular type of communication system or channel crosstalk measurement application. The disclosed techniques are suitable for use with a wide variety of other communication systems, and in numerous alternative crosstalk measurement applications. For example, although illustrated below in the context of DSL systems based on OFDM, the disclosed techniques can be adapted in a straightforward manner to other types of wired or wireless communication systems, including cellular systems, multiple-input multiple-output (MIMO) systems, Wi-Fi or WiMax systems, etc.

Figure 1:
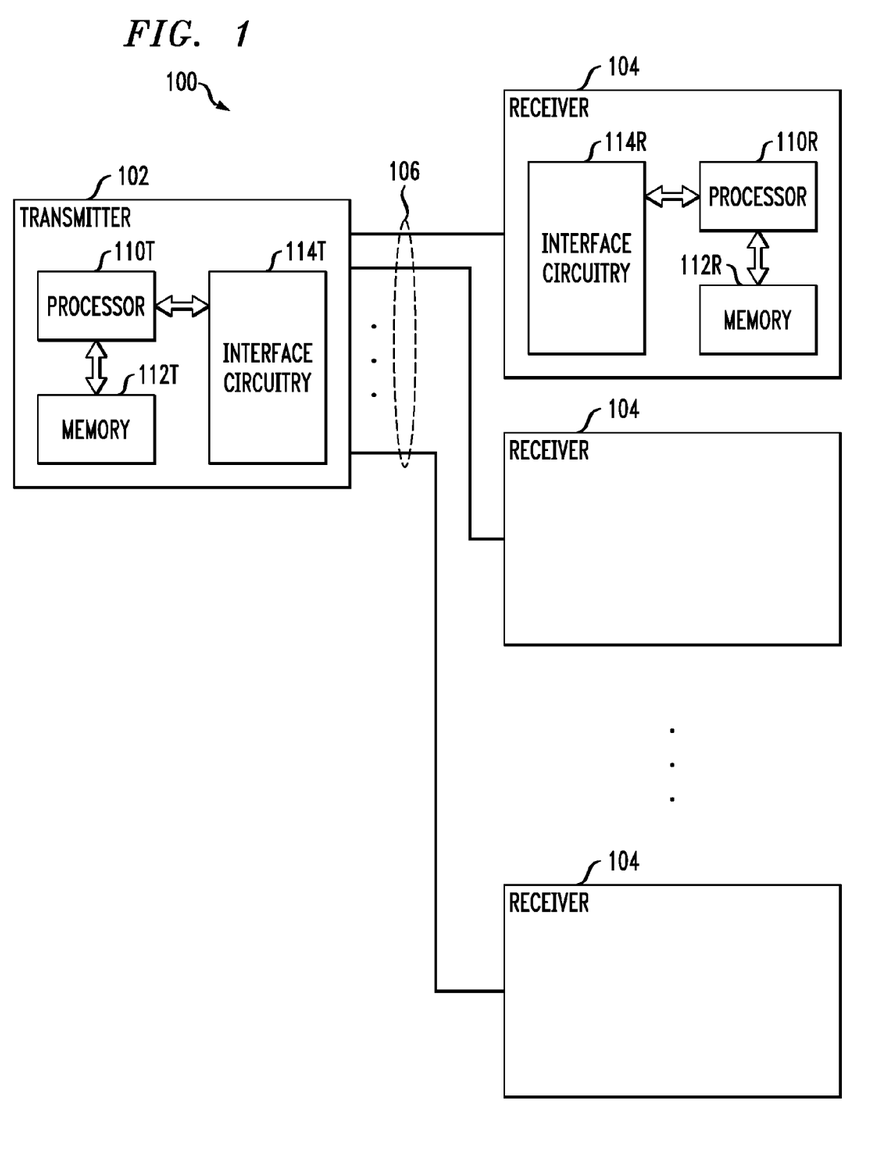
FIG. 1 illustrates an overview of a communication system in accordance with which principles of the invention may be implemented.

FIG. 1 shows a communication system 100 comprising a transmitter 102 that communicates with multiple receivers 104 over respective communication channels 106. The communication channels 106 may comprise wired channels or wireless channels. As shown in FIG. 1, the transmitter 102 comprises a processor 110T coupled to a memory 112T and interface circuitry 114T. Similarly, a given one of the receivers 104 comprises a processor 110R coupled to a memory 112R and interface circuitry 114R. The other receivers 104 are assumed to be configured in a similar manner.

Although a single transmitter is shown communicating with multiple receivers in the illustrative system 100, numerous other configurations are possible. For example, multiple transmitters may communicate with multiple receivers, or a single transmitter may communicate with a single receiver. The terms "transmitter" and "receiver" as used herein are intended to be construed generally, so as to encompass single respective transmitter and receiver elements as well as combinations of multiple respective transmitter and receiver elements. Also, the transmitter 102 may comprise multiple separate transmitters, for example, in the case of a central office in a DSL system, or a base station in a cellular system.

Moreover, a given communication device of the type shown in the figure may function as both a receiver and a transmitter. Thus, elements 102 and 104 of system 100, although characterized as respective transmitter and receiver elements for purposes of illustration, may each comprise transceiver circuitry and be operative to function as both a transmitter and a receiver. The crosstalk compensation techniques disclosed herein may therefore be applied to transmissions from an element 104 to the element 102. Elements 102 and 104 may comprise or be incorporated into respective processing devices of a communication system, such as modems, computers or other communication devices. Numerous such devices are well known to those skilled in the art and are therefore not further described herein.

Software programs for compensation of crosstalk and performance of associated transmitter and receiver signal processing operations in the system 100 may be stored in the memories 112 and executed by the processors 110. The transmitter 102 and receivers 104 may each comprise multiple integrated circuits, digital signal processors or other types of processing devices, and associated supporting circuitry, in any combination, using well-known conventional arrangements. Of course, numerous alternative arrangements of hardware, software or firmware in any combination may be utilized in implementing the transmitter 102 and receivers 104 or particular portions thereof.

The system 100 as shown in the figure may be viewed as being representative of any of a number of different types of communication systems. By way of example, the system 100 may comprise a DSL system in which data is transmitted using OFDM tones. Conventional aspects of such systems are well known and therefore not described in detail herein. Inter-channel crosstalk in a DSL system using OFDM may comprise, for example, far-end crosstalk (FEXT), although the disclosed techniques are more generally applicable to a wide variety of other types of crosstalk. Because the OFDM tones are typically relatively narrow with respect to the total frequency spectrum used, the impact at a particular frequency may be modeled as a single complex coefficient h denoting the crosstalk into a given "victim" subscriber line from a given "disturber" subscriber line at a given tone index. The amplitude of the coefficient represents the change in scale for the corresponding OFDM carrier whereas the phase of the coefficient represents the change in phase for that carrier.

The crosstalk between the multiple communication channels 106 over which transmitter 102 communicates with receivers 104 in the system 100 may be compensated using an approach referred to as precoding, also known as precompensation. In one precompensation approach, crosstalk measures determined by the receivers and communicated to the transmitter are used to determine coefficients of a channel matrix. Effective precoding generally requires accurate channel gain and phase information. For example, using a linear crosstalk model to characterize N channels, an N×N channel matrix may be generated, with the off-diagonal elements of the matrix representing the above-noted complex coefficients characterizing the inter-channel crosstalk. The precoding may be applied in the transmitter using a linear zero-forcing digital filter (or precoder) that receives as its inputs a vector of data signals to be transmitted and the above-noted channel matrix and generates therefrom a vector of compensated data signals.

Another application in which measures of inter-channel crosstalk may be used is in managing the various channels of the system. For example, such measures may be used to determine an optimum allocation of power or other resources among the channels or to provide stability of channel bit rates. In the DSL context, this may involve utilizing the measures to improve dynamic spectrum management (DSM) level 2 power assignments or stability algorithms, thereby facilitating the maintenance of a declared bit rate for a given line. These and other resource allocation applications typically require less accurate estimates, and hence may not need channel phase information.

The transmitter 102 and receivers 104 of system 100 in FIG. 1 are advantageously configured such that estimates or other measures of inter-channel crosstalk may be generated in an accurate and efficient manner. Such crosstalk measures may be returned from the receivers 104 to the transmitter 102 for use in applications such as precoding or resource allocation of the type described above. The measures may comprise, for example, impulse response coefficients characterizing the crosstalk. Alternatively, measures generated by the receivers may be returned to the transmitter and further processed there to obtain impulse response coefficients.

I. Problem Statement and Overview

It is to be understood that system 100 in FIG. 1, assuming transmitter 102 represents multiple transmitters, represents a MIMO system. In such a system, various users communicate information from multiple transmitters to multiple receivers across a MIMO channel. A given receiver (victim) must attempt to decode information sent by a transmitter in the presence of system noise and interference caused by signals from other transmitters (disturbers). The maximum rate of reliable transmission is limited by the signal-to-interference-plus-noise ratio (SINR). One technique for increasing the SINR is to reduce interference by precoding. With precoding, as mentioned above, signals are passed through an artificial precoding channel before being transmitted into the physical channel. The precoding channel is designed so that the concatenation of the precoder and the physical channel results in little or no interference at the receiver.

Herein, some embodiments may incorporate apparatus and/or methods or may be used to operate apparatus and/or methods described in one or more of U.S. patent applications respectively identified by Ser. No. 11/848,684 (attorney docket number De Lind Van Wijngaarden 21-10-18-7 and entitled "Method and Apparatus for Self-Tuning Precoder"), Ser. No. 11/897,877 (Kramer 9-16-6 and entitled "Determining a Channel Matrix by Measuring Interference") and Ser. No. 11/897,809 (Guenach 1-12-1-1-1-1-1-20-1-9 and entitled "Determining Channel Matrices by Correlated Transmissions to Different Channels"), all filed on Aug. 31, 2007, and the U.S. patent application identified by Ser. No. 11/796,366 (attorney docket no. Kramer 7-11-14-9 and entitled "Operating DSL Subscriber Lines"), filed on Apr. 26, 2007, the disclosures all of which are incorporated by reference herein in their entirety.

Herein, the inventions also include digital data storage medium encoded with one or more processor executable programs of instructions. Here, the instructions may perform and/or control execution of the steps of any of the methods described herein.

The performance of such a precoder system depends critically on the parameters of the precoding channel (represented by and referred to hereafter as the preceding matrix). Hence a method is required to determine a sufficient preceding matrix for a given system. Previous related patent applications have disclosed methods for continuously improving the quality of a precoder matrix using SINR feedback. In such methods, the SINR is measured periodically at each receiver, and this information is used by the control apparatus of the transmitter to determine changes in the channel and to adjust the precoder matrix accordingly in order to suppress interference at the receiver.

In some systems, the feedback mechanism may not report the SINR for each receiver, but instead may report the average SINR for a group of receivers. We will refer to such a measurement as the "group SINK" hereafter. Examples of a system that may use group SINK measurements include some OFDM DSL systems where signals are transmitted across twisted pair lines, using a number of different sub-carriers (i.e., frequencies or tones). There is a receiver and transmitter associated with each sub-carrier on each line. Standards governing certain such systems dictate that the SINR feedback mechanism should report the average SINR for a group of 1, 2, 4, or 8 sub-carriers on each line, see, e.g., ITU-T Recommendation G.993.2: Very high speed digital subscriber line transceivers 2 (VDSL2), February 2006, the disclosure of which is incorporated by reference herein in its entirety. Such a group of sub-carriers may be referred to as a "supertone" or "tone group."

The methods disclosed in accordance with the invention are designed, e.g., to adaptively improve precoder matrices for systems of this type, in which the SINR feedback reports group SINR for groups of receivers, rather than SINR information for each receiver. In most of the following sections, we will describe the methods in terms of OFDM DSL systems. The average SINR referred to is the geometric average of the linear scale SINRs, or equivalently, the arithmetic average of the log-scale SINRs. In the second to last section below, we will also discuss a method that applies instead to the case in which the average SINR is the arithmetic average of the linear scale SINRs.

There are a various methods described below for precoder tuning by average SINR feedback. Different methods are based on different assumptions about the way that cross-talk coefficients vary as a function of tone (sub-carrier frequency). The methods that assume more smoothness in the cross-talk model tend to be faster. In general, there will be a tradeoff between speed and performance, and the best method will depend on the particular situation. One can use the same method for all supertones in a system, or one can use different methods on different supertones, depending on the observed or expected smoothness properties. On a given supertone, one might begin tuning with a fast method and gradually shift to slower, better performing methods when time permits. Advantageously, a finite state machine or similar software structure may be used to determine when to switch between different control methods.

II. System Model and Notation

Figure 2:
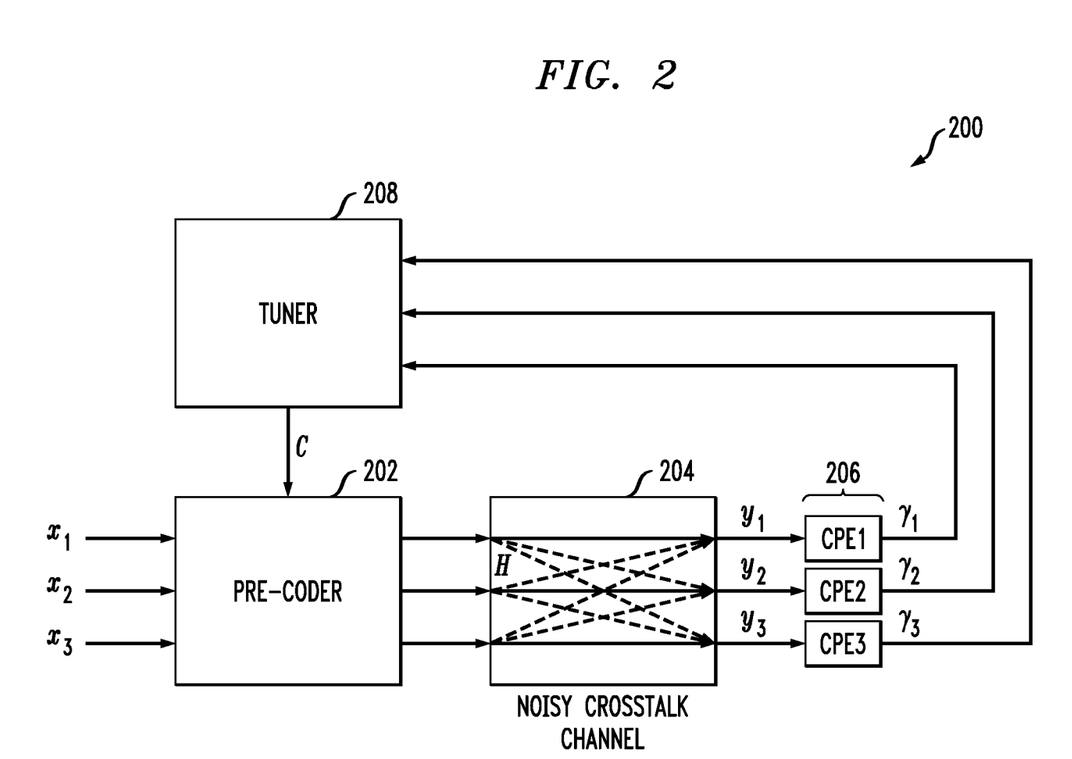
FIG. 2 illustrates a communication system with precoder tuning via signal-to-interference-plus-noise ratio feedback according to a first embodiment of the invention.

The basic apparatus of an OFDM DSL system 200 with precoder tuning by SINR feedback is illustrated in FIG. 2. Such a system would be used to transmit information from a central office, over N digital subscriber lines to receivers in N remote devices commonly referred to as Customer Premise Equipment (CPE). FIG. 2 shows N equal to three for simplicity, but the invention is not limited to any particular number. The information intended for CPE i is encoded into a DSL signal $x_i$, for i=1, ..., N. For the purposes of this description, $x_i$ is a complex number representing the magnitude and phase of the modulated carrier signal. The collection of such signals may be denoted in vector notation by x. The signals pass through a precoder 202 which forms N precoded signals using a linear transformation defined by a matrix C. The vector of precoded signals may be expressed Cx. The precoded signals are then sent through a noisy crosstalk channel 204. The channel can be described by a crosstalk matrix H and a set of noise powers $\{\eta_i\}$. The element $H_{i,j}$ of the crosstalk matrix denotes the complex gain that exists between the channel input on line j and the receiver on line i. The element $\eta_i$ denotes the ambient noise experienced by receiver i. Using this notation, the N channel outputs $\{y_i\}$ can be expressed as:

$$y = HCx + \eta.$$

The effective channel matrix is B=HC. For i≠j, the element $|B_{i,j}|^2$ represents the interference power obtained on receiver i when unit power is applied to line j. In general, when power of the input line j to the precoder is denoted $P_j$, the resulting interference on line i is $|B_{i,j}|^2 P_j$. The purpose of the precoder is to eliminate or reduce the interference. This is done by choosing a crosstalk matrix such that B is a diagonal matrix, or as nearly diagonal as possible.

In various systems, the channel coefficients H are not known, and hence it is not known which precoder matrix C will make B diagonal. One way to obtain acceptable precoder matrices is to iteratively improve the precoder based on SINR feedback. As depicted in FIG. 2, in various systems, each CPE receiver (206) estimates the current signal-to-interference-plus-noise ratio (SINR). Denote by $g_i$ the SINR at receiver i. The estimated SINR can be fed back to a computing system referred to as a precoder tuner 208. The tuner iteratively chooses a precoder matrix C, receives the corresponding set of SINRs $\{g_i(C)\}$, and the cycle repeats. The precoder matrices are chosen in order to: (1) yield information about the unknown crosstalk matrix H; and (2) reduce the interference on line i. As the iterations proceed, the precoder settings are gradually improved and the SINR gradually increases.

Figure 3:
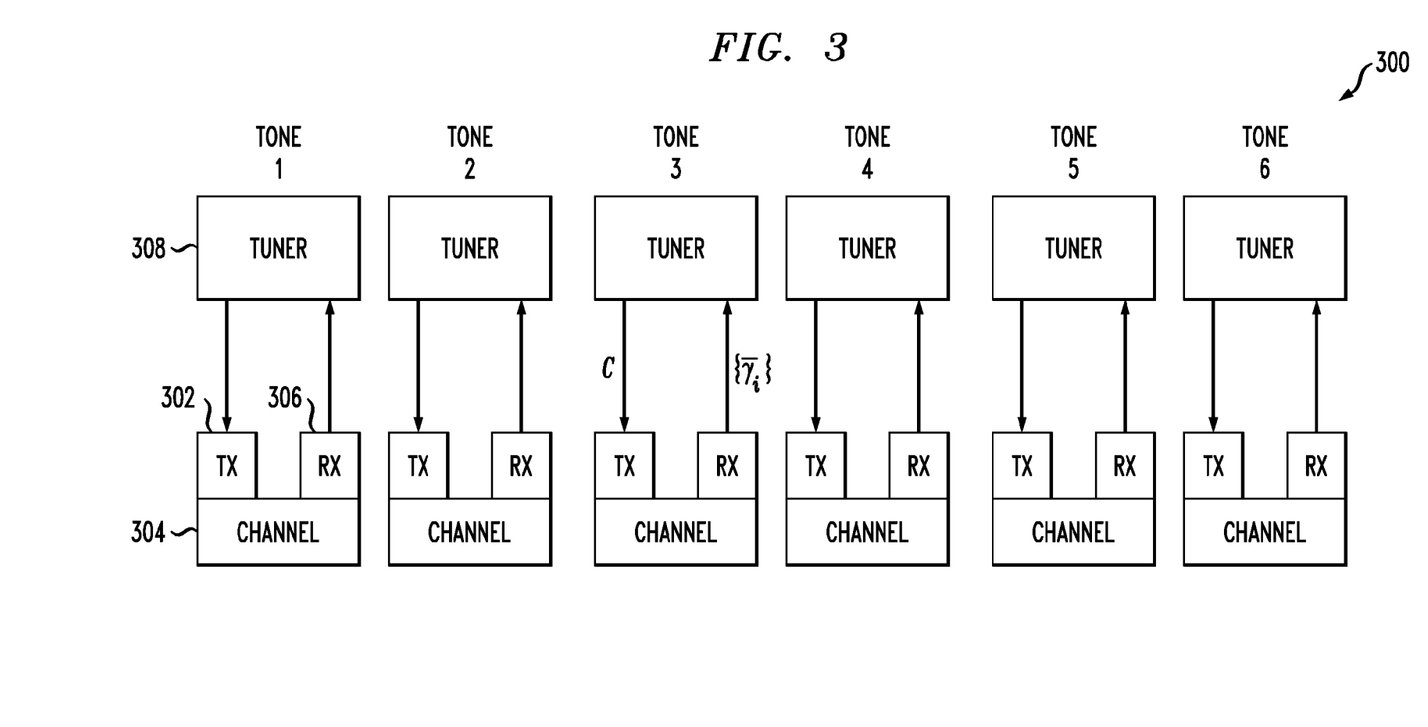
FIG. 3 illustrates a communication system with precoder tuning via signal-to-interference-plus-noise ratio feedback according to a second embodiment of the invention.

In an OFDM DSL system, the preceding steps are applied in parallel to a number of channels on various sub-carrier frequencies, or tones. In the VDSL standard, for example, there may be as many as 4096 tones. FIG. 3 depicts a system 300 with six tones. On each tone (for simplicity, reference numerals are not repeated for each tone), there is a transmitter 302 (including a precoder), a channel 304 including N lines, and a receiver 306. A separate tuner 308 is associated with each tone. This tuner receives SINR estimates for that tone and then sets the precoder matrix C for the transmitter associated with that tone.

Figure 4:
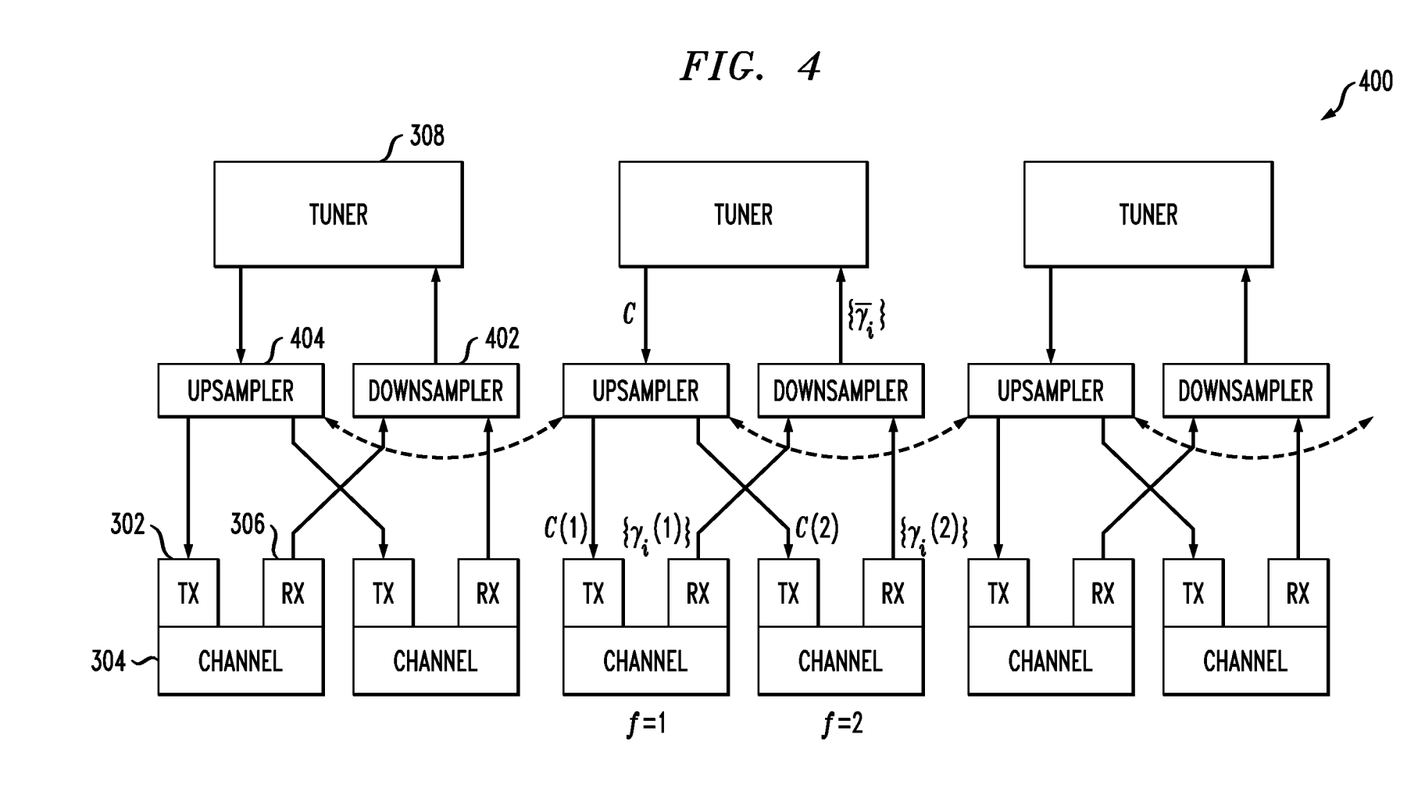
FIG. 4 illustrates a communication system with precoder tuning via signal-to-interference-plus-noise ratio feedback according to a third embodiment of the invention.

In certain systems, the SINR is not reported on a per-tone basis. As depicted in FIG. 4, the SINRs from a group of tones are combined by a device we refer to as a down-sampler 402. The down-sampler takes as input a vector of F SINR values $g_i$ (f), f=1, ..., F and produces a single value as output. In particular, we are interested in the case that the down-sampler performs geometric averaging. That is, the down-sampler produces the output:

$$\bar{g}_i = \left[\prod_{f=1}^{F} g_i(f)\right]^{1/F}$$

The case F=2 is illustrated in the figure. When such a down-sampler is present, it is advantageous to have a reduced number of tuners, so that one tuner is associated with each down-sampler, or equivalently, with each group of tones, as defined by the inputs to each down-sampler. The tuner produces control signals suited to define a precoder matrix C for one tone. It is then useful to introduce a device we will refer to as an up-sampler 404 that takes the control signals for a precoder matrix as input, and produces control signals for the F precoder matrices for the F tones in a group. The various methods described herein use this structure. They differ primarily in the type of up-sampler used. In addition, some methods may require changes to the way that the transmitter operates. For example, in one method there are restrictions on the transmission powers within a group, and in another method artificial noise is added at the transmitter. Advantageously, in all cases, the CPE device does not change, and hence these methods may be implemented using the same CPE equipment as would be used if there were no down-sampling of the SINRs.

In all the methods described below, the down-sampler is the geometric average of the SINRs in a group of tones.

III. Sequential Method

The previously disclosed methods of precoder tuning generally based on SINR feedback do not depend on the absolute scale of the SINR, but rather depend on relative changes in SINR as a function of changes to precoder coefficients. For example, these methods would continue to work if a system were to multiply the estimated SINR by a fixed, unknown constant before reporting it to the tuner.

This fact can be exploited to tune the precoder for any particular tone within a supertone, using as feedback the average SINR for the supertone. Suppose that one wants to tune a particular chosen tone f. The precoder coefficients and transmit powers of all other tones in the group should be held fixed, so that the individual SINRs of the other tones are fixed. For a supertone with F tones, the average SINR of line i raised to the F-th power, $\bar{g}_i^F$ is equal to the SINR on line i of tone f multiplied by a fixed, unknown constant (namely, the product of the SINR values of the remaining F−1 tones). Thus, the tuner may use $\bar{g}_i^F$ as an estimate for $g_i(f)$, where f is the chosen tone, and proceed as in the single tone case.

The up-sampler in this case takes the control signals from the tuner and applies them to the chosen tone f. The up-sampler applies constant control signals to the remaining tones in the group so that those precoders remain constant. During other time periods, a different tone f' may be chosen.

In order to tune the precoder for each tone within a supertone, this method can be applied sequentially to each tone in the supertone. While tuning a given tone, precoder coefficients for all other tones in the supertone are held fixed. This would typically take F times longer than would be needed to tune all F tones in parallel if there was no down-sampler. A flow chart for this method is included in FIG. 5.

Figure 5:
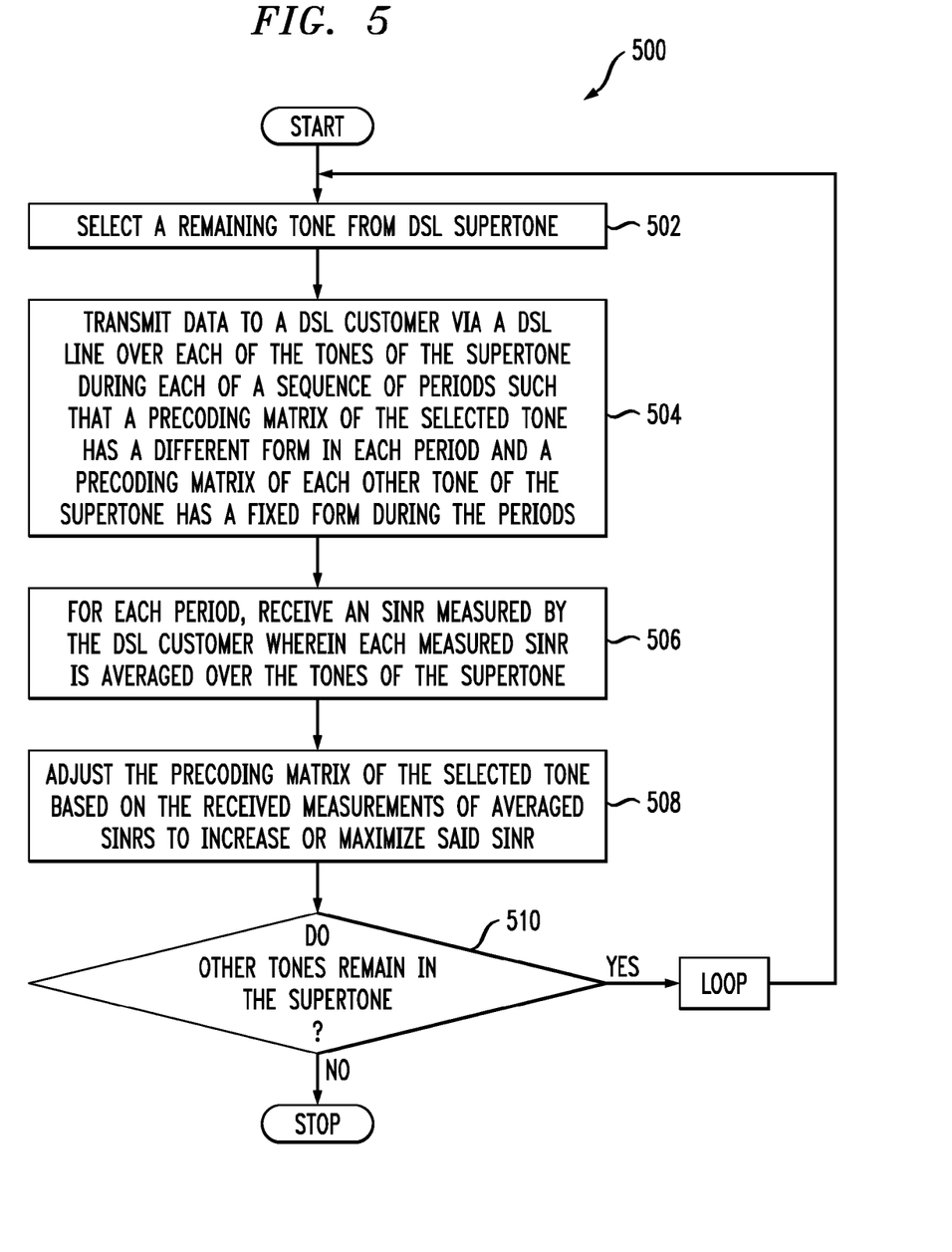
FIG. 5 illustrates a methodology for precoder tuning via signal-to-interference-plus-noise ratio feedback according to a first embodiment of the invention.

As shown in method 500, a tone (remaining) is selected from a DSL supertone in step 502.

In step 504, data is transmitted to a DSL customer via a DSL line over each of the tones of the supertone during each of a sequence of periods. For example, a preceding matrix of the selected tone may have a different form in each period and a preceding matrix of each other tone of the supertone may have a fixed form during the periods.

In step 506, for each period, an SINR value measured by the DSL customer is received. Each measured SINR is averaged over the tones of the supertone.

In step 508, the preceding matrix of the selected tone is adjusted based on the received measurements of averaged SINRs to increase or maximize said SINR.

In step 510, it is checked whether any other tones remain in the supertone. If no, then method 500 ends. If yes, then method 500 loops back to step 502 and repeats.

Various methods for precoder tuning make use of some knowledge of the precision and statistical properties of the SINR feedback estimates $g_i$. Given the precision and statistical properties of the average SINR measurement $\bar{g}_i$, those skilled in the art can readily determine such properties for the F-th power of the average SINR measurement, and adapt the operation of the precoder tuner accordingly. In general, the larger the group of tones, the worse the precision under this method. For example, according to certain VDSL standards, average SINR for a group of F=8 tones is reported on a logarithmic scale with 0.5 dB precision. The 8-th power of the average SINR would then have a precision of 4 dB on a logarithmic scale.

IV. Methods with Strong Smoothness Assumptions

Empirical measurements show that the crosstalk coefficients vary slowly with frequency in both magnitude and phase. Let $H_{k,j}(f)$ denote the (j,k) element of the crosstalk matrix H(f) associated with the tone f. This is the complex gain (crosstalk coefficient) from transmitter j to receiver k on tone f. With reference to such a coefficient, line j is commonly called the disturber, and line k is called the victim. A reasonable approximation in some cases is to represent the crosstalk in the form:

$$H_{k,j}(f) = H_{k,j} e^{iq(k,f)}$$

where $H_{k,j}$ is a complex coefficient that does not depend on tone, while q(k,f) is a phase rotation that does not depend on the disturber line j. The approximation typically only works well for a small group of consecutive tones, f∈F. This implies that the relative crosstalk:

$$g_{k,j}(f) = \frac{H_{k,j}(f)}{H_{k,k}(f)} = \frac{H_{k,j}}{H_{k,k}}$$

does not depend on tone for f∈F. The direct implication of this is that the optimal precoder coefficients also do not depend on tone.

In cases where this approximation is taken to be accurate over a supertone, the two methods described below may be used.

Both methods use the same up-sampler. The up-sampler takes as input the control signals for one precoder matrix and creates F identical copies of these control signals, so that the F pre-coder matrices within a group of tones are always identical to each other.

A. Uniform Method

Under this method, the same precoder coefficients are used on each tone within a group, and the transmit power is also assigned uniformily across tones in a group on each line. Denote by $P_j(f)$ the transmit power level (at the precoder input) of the tone f on line j. The constraint used in this method is that for line j there is one power level $P_j$ such that $P_j(f)P_j$ for $f=1, \ldots, F$. As a result, all tones within the group experience a common SINK $g_i(f)=g_i$, and the reported average SINR $\bar{g}_i$ is an estimate of this common value. This fact can be verified by examining equation (3) below, substituting $P_j$ for $P_j(f)$. Various methods of precoder tuning via SINR feedback, etc. can be directly applied as a means to learn the relative crosstalk coefficients and determine the precoder control signals to send to the up-sampler.

It is also possible to use this method without constraining the transmit powers to be exactly identical across tones. However, in this case, the behavior of the SINR as a function of the precoder matrix is different from the single tone case. It would be prudent to choose a tuning method that is robust, i.e., is not very sensitive to changes in the model.

B. Artificial Noise Method

In this approach, the same precoder coefficients are again used on each tone within a supertone, but the transmit powers are allowed to vary with tone. Known levels of artificial noise are added at the transmitter in a way that manipulates the average SINR measurement and allows the estimation of particular crosstalk coefficients.

In order to effectively describe the artificial noise method, is useful first to describe a set of methods we will refer to as the SINR difference method, as it applies in the case that there is no down-sampler. In various SINR difference tuning methods, the goal is to reduce interference on a victim line. A key element of this method is the ability to estimate the change in interference that results from a change in the pre-coder matrix. Recall that for a particular tone, H denotes the complex matrix of channel coefficients and C the complex matrix of precoder matrices, B=HC is the matrix denoting the resulting effective channel, and $P_j$ denotes the transmit power on line j. The SINR $g_i$ on line i can then be expressed:

$$g_i(C) = \frac{|B_{i,i}|^2 P_i}{\sum_{j \neq i} |B_{i,j}|^2 P_j + \eta_i} = \frac{|B_{i,i}|^2 P_i}{|B_{i,k}|^2 P_k + I_{i,k}} \quad (1)$$

where $I_k$ is a notation used to summarize the total interference at receiver i due to noise as well as interfering lines other than k.

In various methods, one proceeds in iterations, and within one iteration, the goal is to reduce the interference caused by disturber line k on victim line i. During this phase, the method will make changes to the k-th column of C. Suppose that C' is a new precoder matrix obtained from C by changing certain elements of the k-th column of C. That is $C'_{m,j}=C_{m,j}$ if $j \neq k$. Then the new effective channel B'=HC' will differ from B=HC only in the k-th column. The change in interference from line k to line i caused by the perturbation to C can be estimated by measuring $g_i(C)$ and $g_i(C')$ and taking differences of their inverses. Manipulating (1) one obtains the relationship:

$$\left|\frac{B'_{i,k}}{B_{i,i}}\right|^2 - \left|\frac{B_{i,k}}{B_{i,i}}\right|^2 = \frac{P_i}{P_k}[1/g_i(C') - 1/g_i(C)], \quad (2)$$

showing that the change in relative crosstalk can be estimated from known quantities $P_i$, $P_k$ and measured quantities $g_i(C')$ and $g_i(C)$. This is the key information used by various SINR difference methods to improve the precoder C.

It is important to be point out here that while methods described herein may refer to changing or updating a precoder matrix C by perturbing the precoder matrix itself (resulting in, for example, C'), the precoder matrix can be alternatively changed or updated by applying an abuse matrix A to the precoder matrix C such that an identical or a substantially similar perturbation result is achieved (C'=A*C).

The artificial noise method provides a way of obtaining similar information from measurements of average SINR over tones produced by the down-sampler. In what follows, assume that the coefficients $H_{i,j}(f)$ follow the smoothness assumptions described above, for tones $f=1, \ldots, F$ in a group, and that up-sampler applies identical precoder coefficients to each tone in the tone group. Denote by $P_j(f)$ the transmit power on line j of tone f. The average SINR $\bar{g}_i(C)$ can be expressed:

$$\bar{g}_i(C) = \left[\prod_{f=1}^{F} \frac{|B_{i,i}|^2 P_i(f)}{|B_{i,k}|^2 P_k(f) + I_{i,k}(f)}\right]^{1/F} \quad (3)$$

In the method, artificial noise with power $n_{i,k}(f)/|H_{i,i}|^2$ is added at the transmitter of line i. By artificial noise, we mean a random or pseudo-random signal that is statistically independent of the data signals $x_i$. Advantageously, the artificial noise could have Gaussian statistics, and be uncorrelated over time. The noise power is chosen to be proportional to $P_k(f)$ according to a fixed ratio $n_{i,k}(f)/P_k(f)=1$ that does not depend on tone. The ratio $\lambda$ is chosen large enough so that the received artificial noise $n_{i,k}(f)$ is significantly larger than $I_{i,k}(f)$, so that the latter term can be ignored in the sense that $n_{i,k}(f)+I_{i,k}(f) \approx n_{i,k}(f)$. In this case, the expression for the average SINR simplifies to:

$$\bar{g}_i(C) = \frac{|B_{i,i}|^2 \bar{P}_i}{(|B_{i,k}|^2 + 1)\bar{P}_k}$$

where $\bar{P}_j$ is the geometric average of transmit powers $P_j(f)$. This simplification then allows one to directly infer changes in the interference as a function of precoder perturbations, using an expression similar to equation (2) used in the single tone case.

$$\left|\frac{B'_{i,k}}{B_{i,i}}\right|^2 - \left|\frac{B_{i,k}}{B_{i,i}}\right|^2 = \frac{\bar{P}_i}{\bar{P}_k}[1/\bar{g}_i(C') - 1/\bar{g}_i(C)].$$

Figure 6:
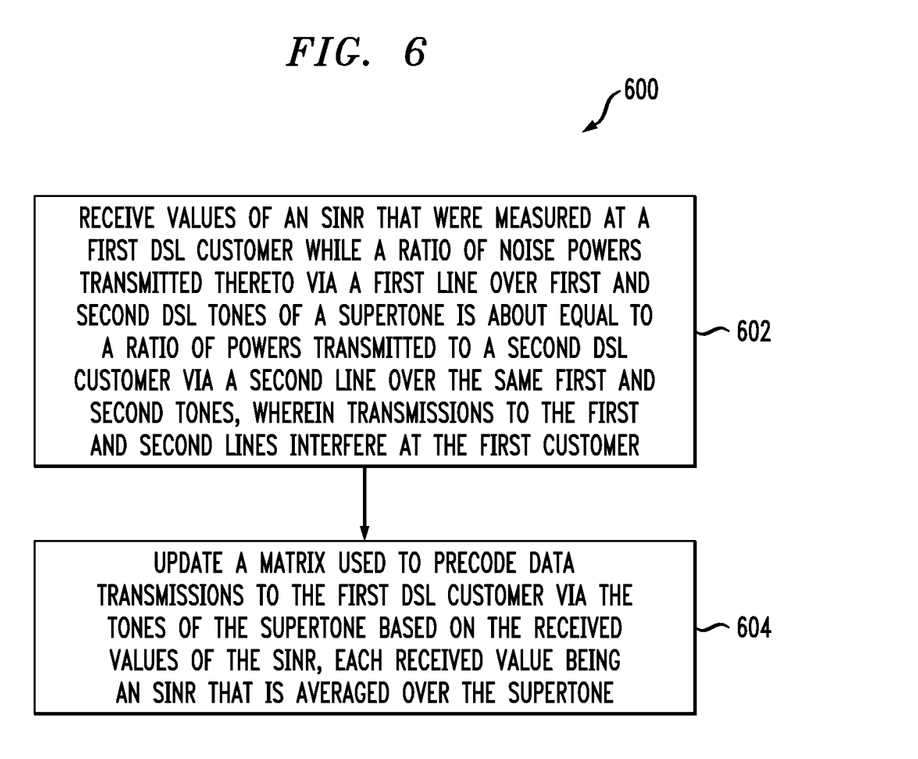
FIG. 6 illustrates a methodology for precoder tuning via signal-to-interference-plus-noise ratio feedback according to a second embodiment of the invention.

A flow chart for this method is provided in FIG. 6.

As shown in FIG. 6, step 602 of method 600 receives values of an SINR that were measured at a first DSL customer while a ratio of noise powers transmitted thereto via a first line over first and second DSL tones of a supertone is about equal to a ratio of data powers transmitted to a second DSL customer via a second line over the same first and second tones, wherein transmissions to the first and second lines interfere at the first customer.

In step 604, the method updates a matrix used to precode data transmissions to the first DSL customer via the tones of the supertone based on the received values of the SINR, wherein each received value is an SINR that is averaged over the supertone.

In general, the precision of the measurement is better when λ is small. Thus, in order to apply this method effectively, it is useful to have a rough estimate of the residual interference $I_{i,k}(f)$ on tone f of line i resulting from all sources other than line k. One can then advantageously choose the smallest λ that is consistent with the requirement that $1 P_k(f)$ dominate $I_{i,k}(f)$ on each tone f, i.e., the requirement that $1 P_k(f) \geq K I_{i,k}(f)$ for some factor K such as K=2. In situations where $P_k(f)$ should be considered fixed, the minimum allowable value of λ would be given by $K \max_i I_{i,k}(f)/P_k(f)$. In other situations, such as when line k is being trained but is not yet transmitting user data, it may advantageously be possible to modify the powers $P_k(f)$ in order to further reduce the minimal allowable value of λ.

One method for obtaining a rough estimate of the residual interference $I_{i,k}(f)$ is to examine the bit-loading coefficients $b_i(f)$. Under common DSL standards, the bit-loading $b_i(f)$ of line i on tone f is known to the transmitter and receiver. The bit-loading approximately satisfies the equation:

$$b_i(f) \approx a \log_{10}(1+\Gamma g_i(f)) \approx a \log_{10}\Gamma + a \log_{10} g_i(f)$$

where a=log (10)/log (2) and Γ are fixed constants, and where a high SINR approximation is used to obtain the right-most expression. Denote by $\tilde{b}_i$ the arithmetic mean of the bit-loading:

$$\tilde{b}_i = 1/F \sum_{f=1}^{F} b_i(f) \approx a\log_{10}\Gamma + a\log_{10}\bar{g}_i$$

From these approximations, a rough estimate for the SINR on tone f of line i is:

$$\log_{10} g_i(f) = \log_{10}\bar{g}_i + 1/a(b_i(f) - \tilde{b}_i).$$

The interference on tone f, line i can be obtained from $I_i(f) = |B_{i,j}|^2 P_i(f)/g_i(f)$.

V. Methods Based on General Smoothness Approximations

In some cases, the relative crosstalk coefficients:

$$g_{k,j}(f) = \frac{H_{k,j}(f)}{H_{k,k}(f)}$$

may exhibit some smoothness as a function of tone, without being independent of tone (as was assumed in the previous section). For example, it may hold to an acceptable approximation that the magnitude and phase of $g_{k,j}(f)$ are linear functions of f within a group. In such cases, the optimal precoder coefficients will also tend to vary smoothly as a function of tone. It may be advantageous in such cases to define a precoder model with a limited number of degrees of freedom that varies smoothly as a function of tone. For example, one could explicitly specify the precoder matrix for the central tone in each supertone, and then define the precoder matrix for all other tones by linear interpolation between the two nearest explicitly specified tones. Alternatively, one could use other forms of interpolation (such as cubic spline), and one could vary the number of explicitly specified tones.

A. Applying General Hill-Climbing Approaches

Some methods of precoder tuning apply robust hill-climbing techniques to attempt to maximize observed SINR as a function of control parameters (the precoder coefficients). In the case of single tone optimization (cf. FIG. 3), the control parameters are the precoder coefficient for a tone, and the optimization objective is the observed SINR. In the case where SINR values are down-sampled (cf. FIG. 4), the same hill-climbing techniques can be applied, except that the control parameters are the set of parameters needed as input to the up-sampler to define the pre-coder coefficients for all tones within the group, and the optimization objective is the average SINR for the supertone. The number of control parameters used to specify the precoder coefficients for a group of tones can vary, depending on the smoothness assumed to be present in the crosstalk and designed into the up-sampler. The smoother the model, the fewer the parameters that need to be optimized over, and the faster tuning converges. On the other hand, models with more parameters may achieve better interference cancellation and higher SINR.

As an example, one could use two parameters to define the magnitude and phase of pre-coder coefficient $C_{i,j}(1)$, and two parameters to define the magnitude and phase of $C_{i,j}(F)$. The up-sampler could then define $C_{i,j}(f)$ for $1 < f < F$ by linear interpolation. As another example, the parameters could specify $C_{i,j}(f)$ for one tone in a group of tones. The up-samplers on adjacent tone groups could communicate these values to each other, and then specify coefficients for all other tones by linear or cubic spline interpolation. The dashed curves in FIG. 4 depict the exchange of information between adjacent up-samplers needed to interpolate pre-coder coefficients across groups of tones.

The effect of column j of a precoder matrix on the SINK of any receiver is separable from the effect of column k of the precoder matrix on that receiver, when j≠k. Thus advantageously, the SINR may be optimized as a function of parameters specifying column j and then as a function of parameters specifying column k, without coupling. This observation still holds true when down-sampling is present; the parameters defining the j-th column on all tones in a group can be optimized independently of the parameters defining the k-th column on all tones.

B. Applying Single Tone Tuners

Various tuning devices designed for the single tone case (cf. FIG. 3) proceed iteratively. In each iteration, they take as input a single SINR observation, and produce as output a single pre-coder matrix to be used in the next iteration. It may be advantageous to apply such devices with little or no change to the case where down-samplers are present (cf. FIG. 4). One way to do this is to use an up-sampler based on interpolation between tone groups. In this method, up-sampler for each tone group applies the precoder control signals from the tuner directly to a chosen tone in the group, for example the central tone. The up-sampler then chooses control signals for all other tones in its group by interpolating between the control signal it received and the control signals received by adjacent up-samplers. In order to do this, each up-sampler should communicate the control signals it receives to the up-samplers on adjacent tone groups. The dashed curves in FIG. 4 depict this exchange of information between adjacent up-samplers. The interpolation creates precoder coefficients $C_{i,j}(f)$ which vary smoothly as a function of tone f, across tone groups. The interpolation may be piecewise linear, cubic spline, or other interpolation methods known to those skilled in the art. A flow chart for this method is provided in FIG. 7.

Figure 7:
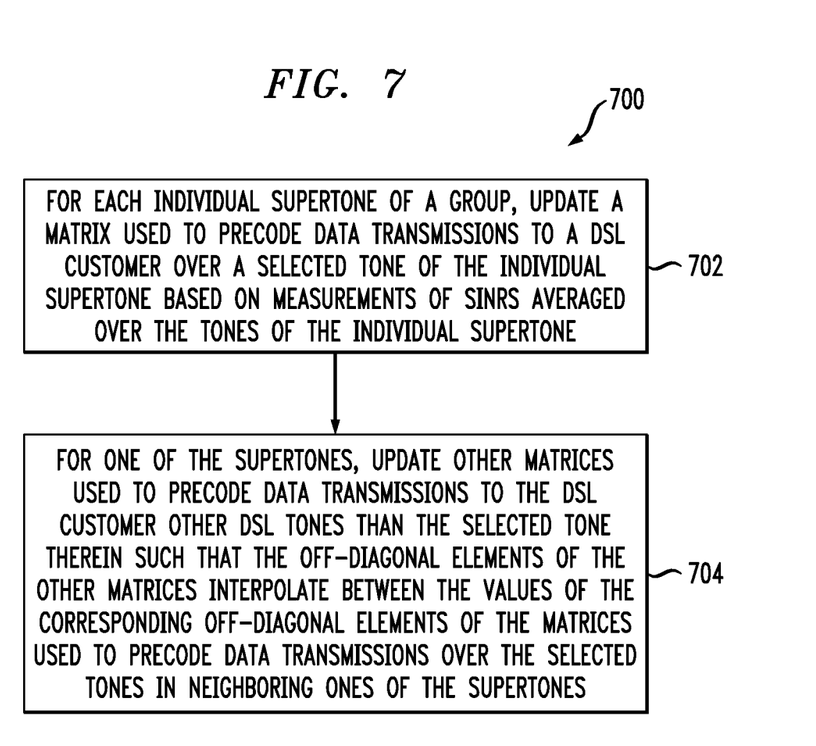
FIG. 7 illustrates a methodology for precoder tuning via signal-to-interference-plus-noise ratio feedback according to a third embodiment of the invention.

As shown in step 702, for each individual supertone of a group, the method 700 updates a matrix used to precode data transmissions to a DSL customer over a selected tone of the individual supertone based on measurements of SINRs averaged over the tones of the individual supertone.

In step 704, for one of the supertones, the method updates other matrices used to precode data transmissions to the DSL customer over DSL tones other than the selected tone therein such that the off-diagonal elements of the other matrices interpolate between the values of the corresponding off-diagonal elements of the matrices used to precode data transmissions over the selected tones in neighboring ones of the supertones.

Certain precoder tuning techniques take advantage of a detailed model of the behavior of SINR as a function of a precoder matrix. Such techniques may or may not be sensitive to situations in which the model does not behave exactly as expected. If such a tuning technique is designed for a model based on FIG. 3, it could fail to work when applied without change in FIG. 4 as described in the previous paragraph. However, it is possible to use such a sensitive technique in conjunction with interpolation in the following way. First, the sequential method of Section III is used to improve the precoder matrix for one tone in each tone group (holding all other tones fixed). Then, precoder matrices for all other tones are updated by interpolation. In other words, for a number of iterations of the tuning procedure, the up-sampler varies the precoder coefficient for one tone while holding the others fixed. Then, the interpolating up-sampler is used to define new, fixed coefficients for all tones. This method may be applied in a repetitive cycle.

VI. Linear Averaging of SINR

The previous methods were motivated by certain DSL systems which report the geometric average of SINR over tones in a supertone. Some of those methods could also be readily adapted to systems which reported the arithmetic average of SINR, in a straightforward manner. In this section, we describe a technique that is designed specifically for cases in which the arithmetic average of SINR (on a linear scale) is used.

In this approach, transmission power settings are varied over a sequence of time intervals in such away that individual receiver SINRs can be estimated from the resulting sequence of group SINR measurements. This method is based on an assumption that there is substantially no interference between channels belonging to the same group. This is true for example in the OFDM system, where each group member uses a different tone, and the tones are designed not to interfere with one another. Note that there can be interference between different channels using the same tone, but that such channels should not be grouped for the purpose of SINR reporting.

For a particular group of N channels, let $P_1, \ldots, P_N$ represent the power transmitted into each channel. Suppose that the precoding matrix is fixed, along with the powers of all channels that interfere with channels in the group in question. The SINR of channel i, denoted $g_i$, is then a linear function of the transmission power, say $g_i = a_i P_i$, where $a_i$ is an unknown coefficient depending on the channel, the precoder matrix, and the transmission powers of channels outside the group.

We consider that it is desired that the system should be operated with powers near the operating point $P = \{P_1, \ldots, P_2\}$ for T consecutive transmission periods. Suppose that on channel i, a multiplicative power off set $\alpha_i^t$ is used at time $t=1, \ldots, T$. That is, at time t, the power $\tilde{P}_i^t = \alpha_i^t P_i$ is transmitted, yielding SINR $g_i^t = \alpha_i^t g_i$ on channel i. The group SINR $$\bar{g}^t = 1/N \sum_{i=1}^{N} g_i^t$$

is measured at time t. The relationship between the sequence of group SINRs and the nominal SINR $g_i$ can be expressed by the system of linear equations, that may be expressed in matrix form as follows:

$$\begin{bmatrix} \bar{g}^1 \\ \vdots \\ \bar{g}^T \end{bmatrix} = \frac{1}{N} \begin{bmatrix} \alpha_1^1 & \cdots & \alpha_N^1 \\ \vdots & \ddots & \vdots \\ \alpha_1^T & \cdots & \alpha_N^T \end{bmatrix} \begin{bmatrix} g_1 \\ \vdots \\ g_N \end{bmatrix}.$$

Let A represent the first matrix on the right-hand side above, where $A_{t,i} = \alpha_i^t$. By choosing appropriate values for the matrix A, it is possible to solve the system of linear equation to obtain one or more of the unknown values $g_i$ in terms of the observed values $\bar{g}^t$. For example, if the number of measurements T is equal to the number of channels in the group N, and if A is chosen to be an invertible matrix, then all values of $g_i$ may be determined, using methods for solving linear equations well-known to those skilled in the art. As another example, if T=2 measurements are used, and for constants $\alpha, \beta$, with $\alpha > \beta$ one sets $\alpha_i^1 = \beta$ for $i>1$, $\alpha_i^2 = \alpha$ for $i>1$, $\alpha_1^1 = \alpha$ and $\alpha_1^2 = \beta$ then this set of two linear systems can be solved to determine $g_i$ from the formula:

$$g_1 = \frac{N}{\alpha^2 - \beta^2} (\alpha \bar{g}^1 - \beta \bar{g}^2).$$

Similar formulas can be obtained for different choices of the matrix A by methods known to those skilled in the art.

Inputting this method into practice, there are a number of factors that may need to be considered when choosing a particular A matrix to apply:

Standards or engineering considerations may dictate upper and lower bounds on the transmitted power. For example, standards typically dictate upper bounds on transmission power. Engineering considerations may dictate that the power should not vary very far from the nominal power settings.

Standards or engineering considerations may dictate limits on the ratios of transmission powers on adjacent tones. That is, there may be a factor $\theta > 1$ such that $P_i$ must be greater than $P_{i+1}/\theta$ and less than $P_{i+1} \theta$.

The observations $\bar{g}$ may be reported with limited precision.

The first two considerations above will constrain the entries $\alpha_i^t$ of the matrix A, preventing them from being too much larger or smaller than unity. It is straightforward to determine the constraints on $\alpha_i^t$ that are implied by given constraints on transmitted power levels. In order to minimize the effects of the third consideration, one would like to make the matrix A as well-conditioned as possible. For example, the example above with T=2 observations can be reduced to a system of two equations in two unknowns, and with eigenvalues $1/N(\alpha+\beta)$ and $1/N(\alpha-\beta)$, and with condition number $(\alpha+\beta)/(\alpha-\beta)$. The condition number is minimized by making the ratio $\beta/\alpha$ as small as possible, within the constraints determined by the first two considerations above.

VII. Additional Sources of Information

In various DSL systems, a number of parameters are fed back to the transmitter by the receiver, in addition to SINR $g_i(f)$. These parameters may include the bit-loading $b_i(f)$ and the fine gain adjustment $G_i(f)$. In some cases, the $g_i(f)$ may be down-sampled, while the other parameters are still fed back for each tone. This per-tone information can be used to assist the SINR feedback method in various ways. For example, the values of $b_i(f)$ may be used to obtain rough estimates of $g_i(f)$, as described in Section IV-B. Such values may be used to obtain upper and lower bounds on $g_i(f)$. The smoothness of $b_i(f)$ and $g_i(f)$ may give an indication of the expected smoothness of the crosstalk coefficients and other unknown parameters as a function of f.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
   transmitting data to at least a first communication network device via at least a first communication line during a sequence of periods;
   for each period of the sequence of periods, receiving a separate value, each value being an average of measurements at the communication network device of measures of crosstalk of a plurality of communication network signal subcarriers, wherein each signal subcarrier of the plurality of signal subcarriers is associated with a corresponding matrix of a plurality of matrices; and
   for each individual signal subcarrier of the plurality of signal subcarriers, updating the matrix for the individual signal subcarrier based on the received values, the matrix for the individual signal subcarrier being configured to precode data transmissions to the communication network device over the individual signal subcarrier;
   wherein updating the matrix comprises:
      for a given one of the plurality of signal subcarriers, selecting one or more matrix elements to be updated in a manner configured to increase the value of the measure of crosstalk that is geometrically averaged over the plurality of signal subcarriers;
      for the given signal subcarrier, determining an estimate of the measure of crosstalk based at least in part on the geometrically averaged measure of crosstalk;
      for the given signal subcarrier, adjusting the matrix for precoding data transmissions for the selected matrix elements; and
      keeping respective matrices for precoding data transmissions for a remainder of the plurality of signal subcarriers other than the given subcarrier fixed.

2. The method of claim 1, wherein the updated matrix for one of the signal subcarriers of the plurality of signal subcarriers is different than the updated matrix for another one of the signal subcarriers of the plurality of signal subcarriers.

3. The method of claim 1, wherein the updated matrix for one of the signal subcarriers of the plurality of signal subcarriers is the same as the updated matrix for at least another one of the signal subcarriers of the plurality of signal subcarriers.

4. The method of claim 1, wherein the plurality of communication network signal subcarriers comprises a plurality of communication network signal subcarriers at proximate frequencies.

5. The method of claim 1, wherein the communication network is a digital subscriber line (DSL) system.

6. The method of claim 1, wherein the signal subcarrier is a digital subscriber line (DSL) tone.

7. The method of claim 1, wherein the measure of crosstalk is a signal-to-interference-plus-noise ratio (SINR).

8. The method of claim 1, wherein the matrix for one of the signal subcarriers of the plurality of signal subcarriers has a different form in each period of the sequence of periods.

9. The method of claim 8, wherein the matrix for another one of the signal subcarriers of the plurality of signal subcarriers has a fixed form during each period of the sequence of periods.

10. A method, comprising:
    transmitting data to at least a first communication network device via at least a first communication line during a sequence of periods;
    for each period of the sequence of periods, receiving a separate value, each value being an average of measurements at the communication network device of measures of crosstalk of a plurality of communication network signal subcarriers, wherein each signal subcarrier of the plurality of signal subcarriers is associated with a corresponding matrix of a plurality of matrices; and
    for each individual signal subcarrier of the plurality of signal subcarriers, updating the matrix for the individual signal subcarrier based on the received values, the matrix for the individual signal subcarrier being configured to precode data transmissions to the communication network device over the individual signal subcarrier;
    selecting one or more matrix elements to be updated in a manner configured to increase the value of the measure of crosstalk that is averaged over the plurality of signal subcarriers;
    wherein the updating comprises setting the matrix for precoding data transmissions over the selected one of the signal subcarriers such that the averaged measure of crosstalk is increased and wherein the updating further comprises setting elements of the matrices for precoding data transmissions over other signal subcarriers of the plurality of signal subcarriers to interpolate between corresponding elements of the matrix for the selected one of the signal subcarriers and an updated matrix for precoding data transmissions over a selected signal subcarrier of a second plurality of signal subcarriers.

11. A method, comprising:
    transmitting data to a first communication network device via a first communication line during a sequence of periods;
    for each period of the sequence of periods, receiving a separate value, each value being an average of measurements at the first communication network device of measures of crosstalk of a plurality of communication network signal subcarriers;
    for each individual signal subcarrier of the plurality of signal subcarriers, updating a matrix based on the received values, the matrix being configured to precode data transmissions to the communication network device over the individual signal subcarrier; and
    transmitting data to one or more second communication network devices via one or more second communication lines during the sequence of periods, the one or more second communication lines being configured to produce interference on the communication line used to transmit data to the first device;
    wherein the transmitting data to the first device comprises transmitting a noise power to the first communication line over the signal subcarriers of the plurality such that a ratio of the noise powers transmitted to first and second ones of the signal subcarriers is equal to a ratio of the data powers transmitted to one of the second devices over the first and second signal subcarriers.

12. A method, comprising:
    receiving a first crosstalk measure that is averaged over a group of at least two subcarriers, each subcarrier of the group of subcarriers being associated with a corresponding precoder matrix of a plurality of precoder matrices;

perturbing one or more precoder matrices for one or more subcarriers in the group;

receiving at least a second crosstalk measure averaged over the group of at least two subcarriers; and updating one or more precoder matrices for one or more subcarriers in the group based on the received crosstalk measures;

wherein perturbing the one or more precoder matrices comprises:

for a given one of the group of signal subcarriers, selecting one or more matrix elements to be updated in a manner configured to increase the first crosstalk measure that is geometrically averaged over the plurality of signal subcarriers;

for the given signal subcarrier, determining an estimate of the measure of crosstalk based at least in part on the geometrically averaged measure of crosstalk;

for the given signal subcarrier, adjusting the corresponding precoder matrix for the selected matrix elements; and keeping respective precoder matrices for a remainder of the group of signal subcarriers other than the given subcarrier fixed.

13. The method of claim 12, wherein the updating step further comprises updating a precoder matrix for one subcarrier only.

14. The method of claim 12, wherein the updating step further comprises updating precoder matrices for all subcarriers using interpolation.

15. The method of claim 12, wherein the perturbation step and the updating step further comprise using a common power level for all subcarriers in the group.

16. The method of claim 12, wherein the perturbation step and the updating step further comprise adding artificial noise to each subcarrier in a group proportional to the signal power transmitted on a disturber line on each subcarrier.

17. The method of claim 12, wherein, during the perturbation and update steps, precoder matrices for subcarriers in a group are defined by control variables.

18. The method of claim 17, wherein the number of control variables is smaller than the number of coefficients in the precoder matrices.

19. The method of claim 17, wherein the control variables are precoder matrix coefficients for a subset of subcarriers in the group, and precoder matrix coefficients for the remaining subcarriers are determined by interpolation.

20. The method of claim 17, wherein the control variables are updated based on one or more of the received crosstalk measures.

21. A method, comprising:

transmitting data to at least a first communication network device via at least a first communication line during a sequence of periods;

for each period of the sequence of periods, receiving a separate value, each value being an average of measurements at the communication network device of measures of crosstalk of a plurality of communication network signal subcarriers, wherein each signal subcarrier of the plurality of signal subcarriers is associated with a corresponding matrix of a plurality of matrices; and for each individual signal subcarrier of the plurality of signal subcarriers, updating the matrix for the individual signal subcarrier based on the received values, the matrix for the individual signal subcarrier being configured to precode data transmissions to the communication network device over the individual signal subcarrier;

wherein each value is an average of measurements at respective ones of a plurality of communication network devices.

22. The method of claim 21, wherein each communication network device of the plurality of communication network devices corresponds to a respective signal subcarrier of the plurality of signal subcarriers such that each measurement at a given communication network device of the plurality of communication network devices is a measurement of a measure of crosstalk of a corresponding signal subcarrier of the plurality of signal subcarriers.

* * * * *

UNITED STATES PATENT AND TRADEMARK OFFICE
CERTIFICATE OF CORRECTION

PATENT NO. : 8,830,812 B2  
APPLICATION NO. : 12/197409  
DATED : September 9, 2014  
INVENTOR(S) : A. E. Ashikhmin et al.

Page 1 of 1

It is certified that error appears in the above-identified patent and that said Letters Patent is hereby corrected as shown below:

In the Specification,

Column 8, line 66, please change "uniformily" to -- uniformly --

Column 9, line 3, please change "$P_j(f)P_j$" to -- $P_j(f) = P_j$ --

Column 9, line 4, please change "SINK" to -- SINR --

Column 9, line 51, please change "$C'_{m,j}{}^! = C_{m,j}$" to -- $C'_{m,j} = C_{m,j}$ --

Signed and Sealed this  
Thirtieth Day of December, 2014

Michelle K. Lee  
*Deputy Director of the United States Patent and Trademark Office*